J. F. HUBLER.
WHEEL PLOW.
APPLICATION FILED MAR. 7, 1912.
1,108,579.
Patented Aug. 25, 1914.
6 SHEETS—SHEET 5.
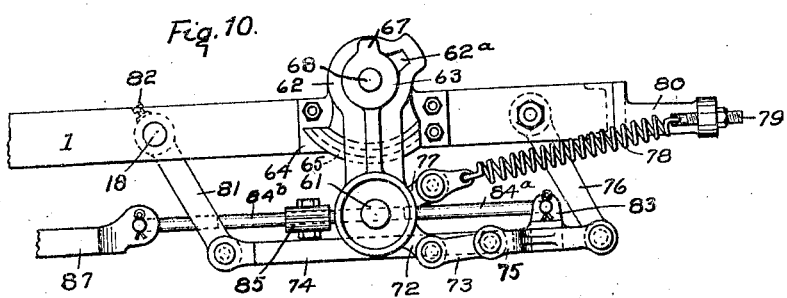
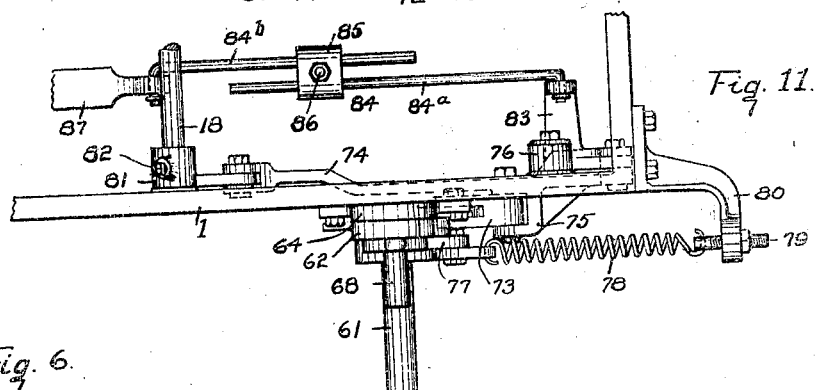
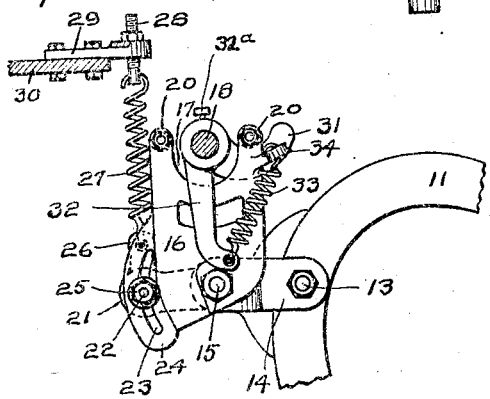
WITNESSES
H. J. Kiess
Isaac U. Taylor
INVENTOR
John F. Hubler,
BY Taylor & Hulse
ATTORNEYS

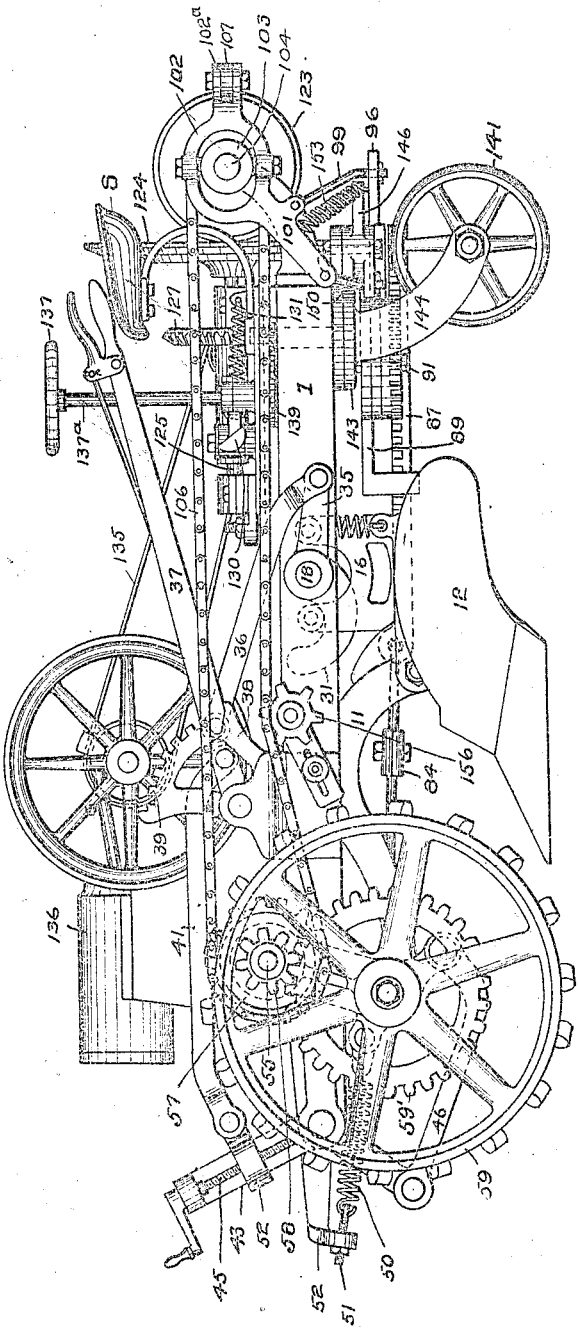

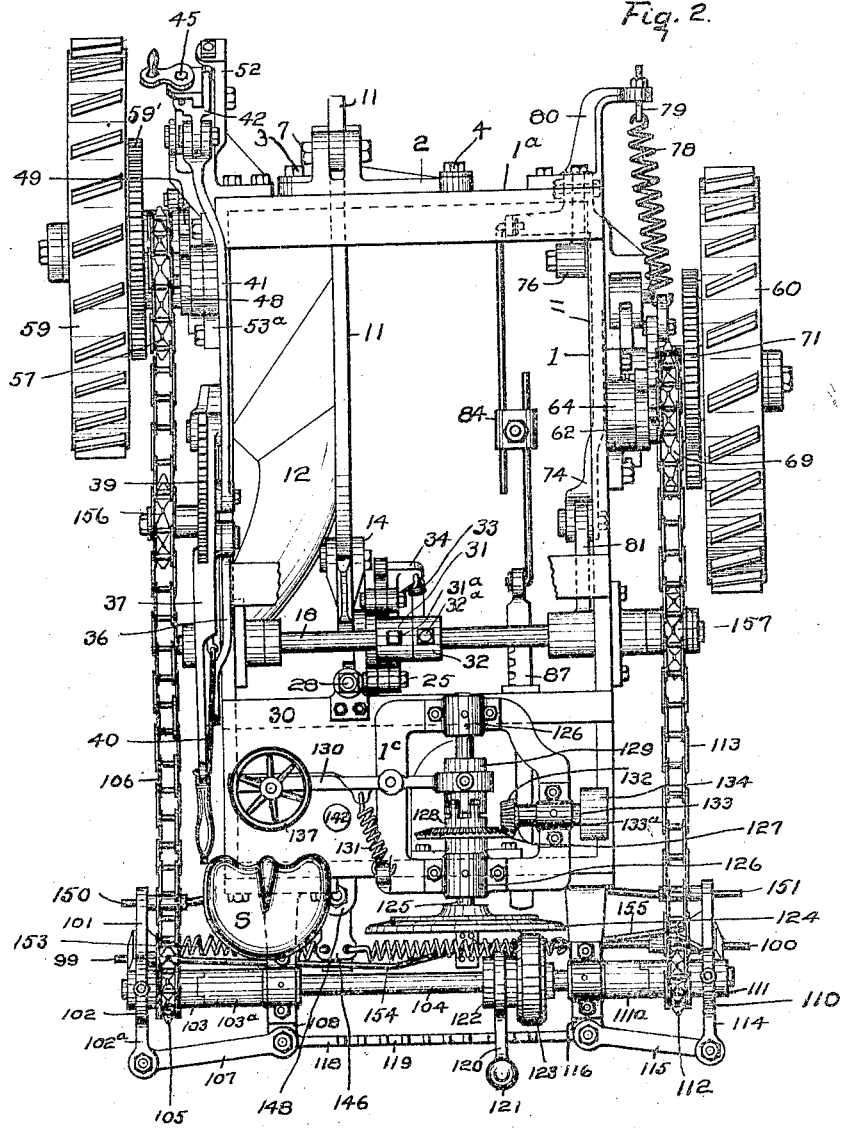

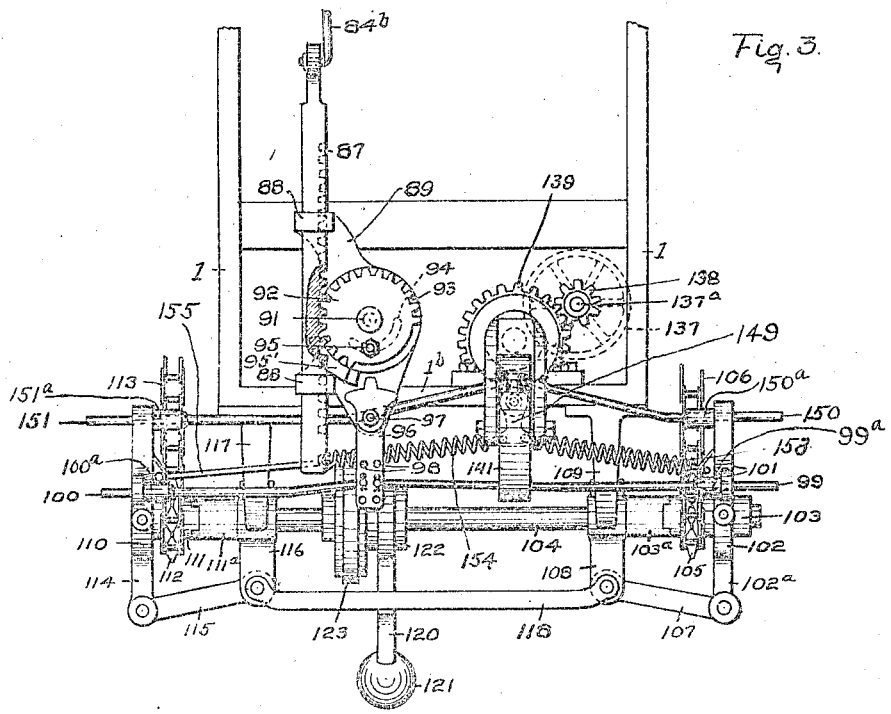

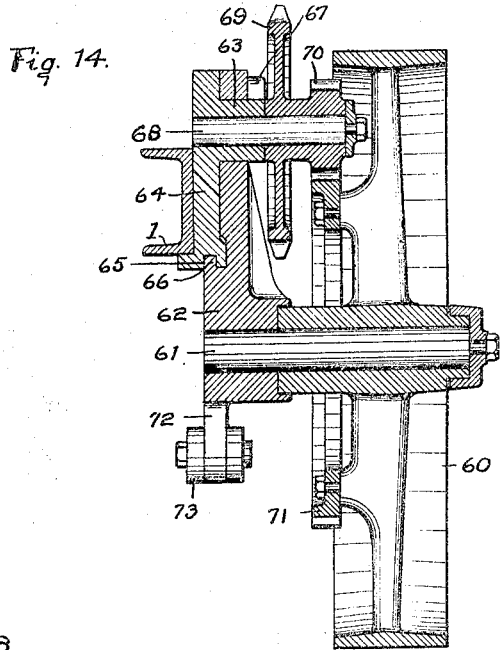
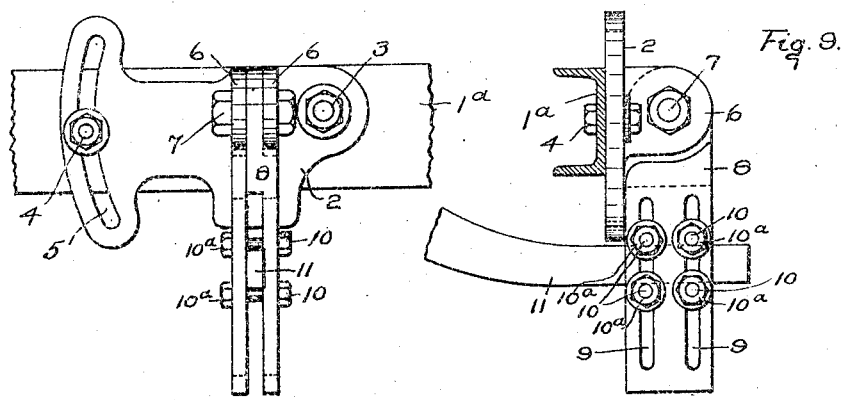

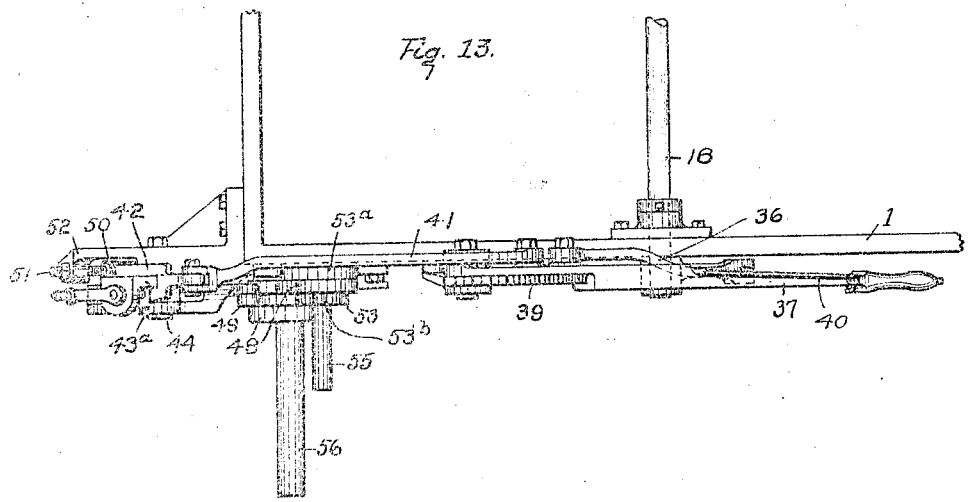
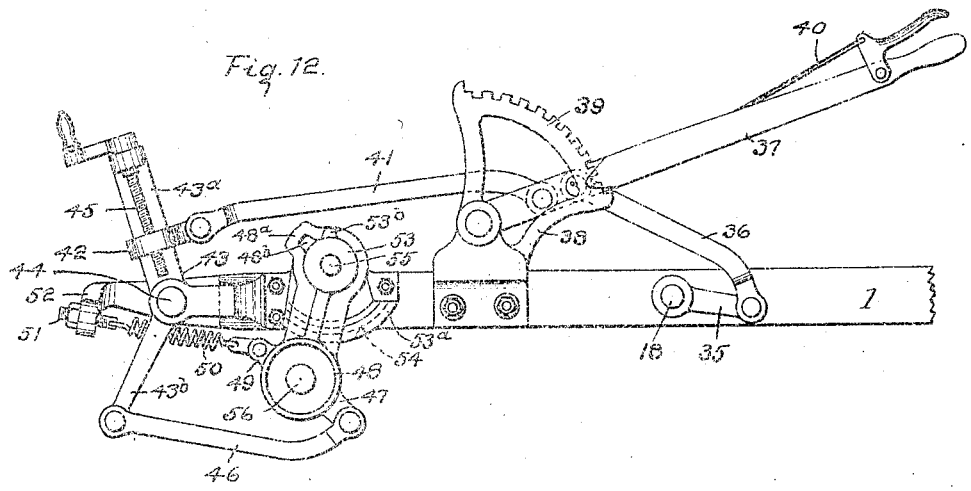

UNITED STATES PATENT OFFICE.

JOHN F. HUBLER, OF NEAR FORT WAYNE, INDIANA.

WHEEL-PLOW.

1,108,579.  Specification of Letters Patent.  Patented Aug. 25, 1914.

Application filed March 7, 1912. Serial No. 682,083.

*To all whom it may concern:*

Be it known that I, JOHN F. HUBLER, a citizen of the United States, residing near Fort Wayne, in the county of Allen and State of Indiana, have invented new and useful Improvements in Wheel-Plows, of which the following is a specification.

My invention relates to wheel plows in general, and particularly to wheel plows adapted to be self propelled in which provision is made for raising and lowering the plow relatively to the supporting wheels.

The objects of my invention are the provision in a plow of the said type, of novel means for supporting the plow; novel means for raising and lowering the plow; novel means for connecting the wheels to the frame; novel means for shifting the wheels back and forth relatively to the frame and other objects hereinafter set forth.

With the foregoing and other useful objects in view my invention consists in the matters hereinafter set forth and claimed.

In the accompanying drawings, Figure 1 is a side elevational view of a self propelled wheeled-plow having my inventions embodied therein; Fig. 2, a plan view of the same, the motive power device being omitted; Fig. 3, a bottom plan view of the rear portion of the device; Fig. 4, a side elevational view of the steering caster-wheel and connections partly in section; Fig. 5, a side elevational view of the front wheel shifting rack and operatively connected mechanism; Fig. 6, a side elevational view of the plow supporting toggle; Fig. 7, a plan view of the structure shown in Fig. 6; Fig. 8, a front elevation of the forward connection of the plow beam; Fig. 9, a side view of the structure in Fig. 8; Fig. 10, a side elevational view of the shifting spindle and connections for the right driving wheel; Fig. 11, a plan view of the structure of Fig. 10; Fig. 12, a side elevational view of the left driving wheel supporting spindle and connections and shifting lever; Fig. 13, a plan view of the structure of Fig. 12, and Fig. 14, a vertical sectional view of one of the driving wheels illustrating the manner of its support on the frame.

Referring to the drawings, 1 is the main frame of the device, preferably constructed of metal. At a suitable point on the front end member 1ª of the main frame is movably secured a plate 2, (Figs. 8, 9) by bolts 3 and 4. A slot 5 in the plate 2 permits of vertical adjustment of the plate on bolt 3, the nuts on both bolts being tightened after the adjustment is made. Two lugs 6 project from the outer face of plate 2 and between the lugs is pivotally supported, by bolt 7, a bifurcated hanger 8. The bifurcated ends of hanger 8 are provided with slots 9, in which slots are two sets of bolts 10, which are secured in any adjusted position within the slots by suitable nuts 10ª on the bolts. Between the upper and lower pairs of said bolts 10 is engaged the forward end of the plow beam 11 which extends within the bifurcated end of hanger 8. By loosening nuts 10ª on bolts 10 the beam 11 may be released and adjusted longitudinally and vertically relatively to hanger 8. By adjusting plate 2 on bolt 3 it is evident that the beam may be tilted laterally.

The rear of the beam 11 (Figs. 1, 2, 6, 7) to which is secured the plow body 12, is secured, by bolt 13, to a bifurcated bracket 14 which extends rearwardly from beam 11. Bracket 14 is bolted, by bolt 15, to a frame 16, the upper portion of which is bifurcated. The upper edges of the bifurcations of frame 16 are recessed at 17 to accommodate shaft 18. Spacing members 19 are inserted between the upper ends of the bifurcated frame 16 and the bolts 20 secure the said ends and spacing members together.

A bar 21 is movably mounted on bolt 15 and projects rearwardly therefrom and carries a laterally projecting threaded pin 22 which projects through a suitable slot 23 formed in a plate 24, which plate projects rearwardly from frame 16. A nut 25 serves to secure bar 21 to plate 24 in any adjusted position thereon. A lug 26 projects upwardly from bar 21, and connected to said lug is one end of a suitable spring 27. The other end of spring 27 is connected to an adjusting screw 28 carried by bracket 29, which bracket is secured to the platform 30 on frame 1.

Adjustably secured by set screw 31ª to shaft 18 is a curved arm 31 which is operative within the bifurcations of frame 16. Another arm 32 is adjustably secured by set screw 32ª to shaft 18 at a suitable point. One end of a suitable spring 33 is secured to the free end of arm 32, the other end of the spring being connected to a lug 34 which is carried by frame 16 at a suitable point. By adjusting arm 32 peripherally on shaft 18 the tension on spring 33 may be varied as desired, and by adjusting extension 21 on plate 24 and by adjusting screw 28 the tension on spring 27 may be varied at will. Frame 16 and arm 31 form a knuckle joint between the plow and shaft 18. When shaft 18 is rotated to the right, Fig. 6, by the means hereafter described, arm 31 will be rocked rearwardly and frame 16, together with the beam and plow connected thereto, will be permitted to descend. Arm 32 necessarily moves coincidently with arm 31 and maintains tension on spring 33 at all times. The purpose of spring 33 is to provide a resilient connection between shaft 18 and frame 16 in order that, when the plow is cutting a furrow, the jar to the knuckle and other connecting parts by which the plow is supported, is more or less absorbed by the spring, thereby prolonging the life of the knuckle. Spring 27, of course, opposes the downward movement of the plow and knuckle joint and assists in elevating the plow off the ground. It also provides an elastic support for the knuckle on frame 1. To elevate the plow, shaft 18 is rotated in the opposite direction whereby arm 31, in its upward movement, raises frame 16 and the plow from the ground.

Shaft 18 is revolubly carried by suitable bearings on frame 1. To one end of the shaft is secured a crank 35 (Fig. 12), the crank being pivotally connected to a link 36 which is pivotally connected to a lever 37. Lever 37 is pivoted to a bracket 38 which is secured to frame 1 and is provided with a suitable rack 39 for engagement by a latch carried by rod 40 by which lever 37 is held in any elevated position. By elevating lever 37 the desired distance, it is apparent that shaft 18 will be rotated forwardly (Fig. 12), or to the right in Fig. 6, thereby lowering the plow the desired amount. This movement of the plow beam is accommodated at the forward end of the beam by pivoted hanger 8. A link 41 is also pivotally connected at one end to lever 37 and at its other end it is pivotally connected to a collar 42, which collar is slidably mounted on one arm 43ª of a bell crank 43, which crank is pivotally mounted at 44 to frame 1. Arm 43ª carries an adjusting screw 45 which is also in threaded engagement with collar 42 and, by the rotation of which, collar 42 may be moved up and down on arm 43 to adjust the throw of crank 43 when lever 37 is operated. The free extremity of the other arm 43ᵇ of the bell crank is pivotally connected to one end of link 46 and the other end of said link is pivotally connected to a lug 47, which is mounted on a swinging bracket 48. A second lug 49 on said bracket is pivotally connected to one end of a suitable spring 50, the other end of the spring being connected to an adjusting screw 51 carried by an arm 52 which is secured to frame 1. Bracket 48 is pivotally mounted on boss 53 which projects outwardly from casting 53ª, which casting is secured to frame 1. The lower edge of the casting is rounded and provided with a channel 54, in which channel a tongue on the inner surface of bracket 48 is slidable to insure accurate coöperation of the parts. A spindle 55 projects outwardly from boss 53 and a spindle 56 is fixed to the lower portion of bracket 48. On spindle 55 is revolubly mounted a sprocket wheel 57 (Fig. 1), and a cog wheel 58 is also mounted on said spindle or may be formed integrally with sprocket wheel 57. On spindle 56 is revolubly mounted one of the drive wheels 59, the periphery of which is provided with suitable projections commonly in use on traction driving wheels. Wheel 59 also carries a cog wheel or ring 59′ which is adapted to mesh with cog wheel 58. Bracket 48, being pivotally mounted on boss 53, forms a swinging support for spindle 56. By elevating lever 37, the links 41 and 46 and bell crank 43 are actuated to swing bracket 48 slightly rearwardly, thereby drawing wheel 59 slightly rearwardly, or frame 1 and the plow move forwardly a short distance while wheel 59 remains stationary for the moment. This shifting of the frame on the wheel permits the point of the plow to take hold of the ground—that is, the forward movement of frame 1 independently of wheel 59 forces the point of the plow into the ground the desired depth as controlled by lever 37.

At the upper end of bracket 48 is a projection 48ª having an opening 48ᵇ therein. A lug 53ᵇ secured on boss 53 is adjacent the outer face of bracket 48 and serves to retain said bracket on the boss. Opening 48ᵇ corresponds in size to lug 53ᵇ and by swinging bracket 48 rearwardly until said opening and said lug are in register, the bracket may be removed from the boss. It is, of course, necessary that wheel 59 and gear wheel 58 and sprocket 57 shall first be removed before the bracket may be removed from or assembled on boss 53.

The driving wheel 60 is mounted on the opposite side of frame 1 in a somewhat similar manner to wheel 59, but rearwardly of the latter. It is revolubly mounted on spindle 61 (Fig. 10) which is secured to bracket or support 62. Bracket 62, similarly to bracket 48, is movably mounted on boss 63 which is formed on casting 64, which casting is secured to the side of frame 1. Casting 64 is provided with a rounded lower edge and has a slot 65 therein similarly to casting 53ª and in said slot is operative a tongue 66 carried by bracket 62 (Fig. 14). The upper end of bracket 62 is provided with an opening 62ª (Fig. 10) similar to opening 48ᵇ in bracket 48 and a corresponding lug 67 on boss 63 similar to lug 53ᵇ on boss 53 serves to retain bracket 62 on boss 63. A spindle 68 is secured to boss 63, and mounted on said spindle is a sprocket wheel 69 and gear wheel 70. Gear wheel 70 meshes with gear wheel or ring 71 on driving wheel 60.

At the lower edge of bracket 62 is a lug 72 to which is pivoted one end of a link 73 (Figs. 10, 11), the other end of the link being pivoted between a bar 74 and bracket 75 carried by said bar. A link 76 is pivoted at one end to the forward end of bar 74, the other end of which link 76 is pivoted to frame 1. A second lug 77 is provided on bracket 62, to which is pivotally connected one end of a suitable spring 78, the other end of the spring being connected to adjusting screw 79 which is carried by bracket 80, which bracket is secured to the forward end of frame 1. A crank 81 is pivotally connected to the rear end of bar 74 and is adjustably mounted on shaft 18, by set screw 82.

Near the forward end of bar 74 and projecting inwardly therefrom is a bracket 83 to which is connected the forward end of an adjustable connection 84 which preferably consists of two rods 84ᵃ 84ᵇ which are secured together in any longitudinal adjustment in split block 85 by bolt 86. The rear end of rod 84ᵇ is connected to the forward end of a rack 87 (Figs. 3–5). Rack 87 is slidably supported in two lugs 88 which depend from plate 89, which plate is provided with an upwardly extending flange 90 which is secured to the rear end member 1ᵇ of frame 1. Suspended beneath plate 89, by bolt 91, is a gear wheel 92, the teeth of which are in mesh with the teeth of rack 87. Between gear wheel 92 and plate 89 is a disk 93 having a slot 94 therein in which is engaged a bolt 95 which also passes through gear wheel 92, and by which bolt the disk and gear wheel are secured together. A projection 95′ is provided on the edge of disk 93 which extends a suitable distance beyond the periphery of gear wheel 92 and is adapted when the gear wheel and disk are rotated forwardly, as hereafter explained, to make contact with the forward extremity of a lever 96, and rock the lever on its pivot. Lever 96 is pivotally mounted by bolt 97 to the lower side of plate 89, and its rear extremity is provided with two series of holes 98. By adjusting disk 93 relatively to gear wheel 92, which is accomplished by loosening the nut on bolt 95 and shifting disk 93 circumferentially, projection 95′ may be brought closer to or removed farther from the forward end of lever 96 and thereby fix the desired throw of projection 95′ to cause it to actuate lever 96 at the proper time. The ends of two rods 99 and 100 may be engaged in any two openings of the two series of openings 98. The rods extend outwardly in opposite directions. The other extremity of rod 99 is slidably engaged in an arm 101 which is part of a yoke 102. A collar 99ᵃ on rod 99 is adapted to engage the inner side of arm 101 on the outward movement of the rod. Yoke 102 encircles and is pivotally connected to a clutch member 103 which is slidably mounted on one end of driving shaft 104 and is adapted to coöperate with another clutch member 103ᵃ which is secured to shaft 104, to cause said shaft to drive a sprocket wheel 105 which is mounted on clutch member 103. A sprocket chain 106 operatively connects said sprocket wheel with sprocket wheel 57 at the forward end of frame 1. Yoke 102 is also provided with a rearwardly extending arm 102ᵃ which is pivotally connected by link 107 to a bracket 108, which bracket, together with bracket 109 which is secured to end member 1ᵇ of frame 1, forms a bearing for shaft 104. Similarly the outer end of rod 100 is slidably engaged in an arm forming part of yoke 110, the rod having a collar 100ᵃ which engages the inner side of the yoke on the outward thrust of the rod. Yoke 110 is pivotally connected to a clutch member 111 slidably mounted on the other extremity of shaft 104, said clutch member carrying a sprocket wheel 112 which is operatively connected by sprocket chain 113 to sprocket wheel 69 at the forward end of that side of frame 1. The clutch is adapted to coöperate with another clutch member 111ᵃ which is secured to shaft 104, by which the shaft may rotate sprocket wheel 112. Arm 114 on yoke 110 is pivotally connected by link 115 to bracket 116 which, with bracket 117, forms a second bearing for shaft 104.

A bar 118 is connected to both brackets 108 and 116 and on its upper surface it is provided with a suitable number of notches 119 (Fig. 2), in any one of which notches a bar 120 may be engaged. Bar 120 may have a suitable weight 121 attached at its rear end. The forward end of the bar is connected to a boss 122 which projects laterally from one face of a friction wheel 123. Friction wheel 123 is splined on shaft 104 and it is adapted to frictionally engage a disk 124 which is secured to the rear end of shaft 125, which shaft is revolubly and slidably carried by bearings 126 which are mounted on sub-frame 1ᶜ, the said sub-frame being mounted on main frame 1. A bevel gear 127, having a clutch member 128 projecting from its forward face, is loosely mounted on shaft 125 and a coöperating clutch member 129 is secured to shaft 126 and is at all times in contact with member 128, there being sufficient longitudinal play between the two members to permit of a rear movement of member 129 and shaft 125 to force disk 127 into contact with wheel 123.

Operatively connected to member 129 is a lever 130 which is pivoted to sub-frame 1c, the other end of the lever being arranged within easy reach of the foot of the operator, who is seated upon the seat S. A spring 131 is connected at one end to lever 130 and its other end to frame 1c rearwardly of the lever so as to oppose the actuation of the lever. The operator, by actuating the free end of lever 130 forwardly forces clutch member 129, shaft 125 and disk 124 rearwardly to cause the disk to make contact with friction wheel 123, thereby causing the shaft 104 to rotate. When he releases the lever spring 131 immediately retracts the lever, and the shaft and therefore disk 124 and wheel 123 are disconnected.

A bevel pinion 132 is secured to one end of shaft 133, which shaft is revolubly mounted in bearing 133a and is provided with a pulley 134. Pulley 134 is connected by belt 135 to a suitable driving mechanism 136, which may be a gasolene engine or any other suitable type of motive power.

At a suitable or convenient point relatively to lever 37 I provide a steering wheel 137, which is secured to a post 137a, which is revolubly supported by platform 30 and projects beneath said platform. At the lower end of post 137a is secured a pinion 138 which is in mesh with a gear wheel 139, which gear wheel is secured to the upper end of spindle 140 of caster wheel 141. The upper end of spindle 140 bears in a cup 142 which is formed in platform 30, and a suitable vertical bearing 142′ supports the spindle and is secured to end member 1b of frame 1. An annular flange 143 projects laterally from the upper portion of the stock 144 of the caster and a portion of the peripheral edge of the flange is provided with teeth to form a partial gear wheel. This wheel meshes with a segment gear 145 which is formed on a Y casting 146. Casting 146 is pivotally mounted by bolt 147 to a flange 148 on bearing 142′. To one forwardly extending arm 149 of casting 146 is connected one end of a rod 150 which extends outwardly and the outer extremity of which is connected to arm 101 of yoke 102, a collar 150a on the rod engaging the inner side of arm 101 on the outward thrust of the rod. A similar rod 151 is also connected at its inner end to arm 149 and at its outer end to yoke 110, a collar 151a on the rod engaging the inner side of the yoke on the outward thrust of the rod. To the rear arm of Y casting 146 are connected the inner ends of two springs 153 and 154, which are substantially equal in strength. The outer end of spring 153 is connected to yoke 102 and the outer end of spring 154 is connected to one end of a rod 155, the other end of the rod being connected to yoke 110. It is apparent that the rotation of wheel 137 to the right (Fig. 2) will cause caster 141 to turn to the right; arm 149 of casting 146 turns to the right, thereby causing rod 151 to disconnect clutch members 111 and 111a. Consequently no power is transmitted by chain 113 to wheel 60, but all the power of the machine is transmitted to wheel 59. The machine, therefore, must turn to the right. In a similar manner the rotation of wheel 137 to the left will cause the caster wheel to turn to the left and sprocket wheel 105 will be disconnected from shaft 104. Consequently all the power of the machine is transmitted to wheel 60 and the machine will turn to the left. The movement of casting 146 in either direction is always opposed by one or the other of springs 153, 154, which springs tend to maintain connection between clutch members 103 and 103a and between members 111 and 111a.

Sprocket chain 106 passes over an idler sprocket 156 which is adjustably secured to frame 1, and a similar idler sprocket wheel 157 is similarly secured to the opposite side of frame 1 over which passes chain 113. These idler sprocket wheels take up the slack in the respective chains, consequently there is no slippage of the chains or loss of power when relative movement takes place between the traction wheels and frame 1.

In operation the operator adjusts wheel 123 on shaft 104 relatively to disk 124 so as to cause the shaft to be driven at the desired speed. Collar 42 is also adjusted on bell crank 43 for the desired throw of crank 43 and thereby predetermines the relative movement between frame 1 and wheel 59 when lever 37 is rocked upwardly on its pivot the desired distance. The operator may then throw disk 124 into contact with wheel 123 by actuating lever 130. Shaft 104 and the connected chains 106, 113 therefore drive the traction wheels 59, 60, it being understood, of course, that caster wheel 141 is now set for straight-ahead running. To lower the plow 12 the operator pushes lever 37 forwardly the desired distance. This movement of the lever causes shaft 18 to rotate forwardly to cause arm 31 to descend, whereby the plow also descends to the ground. The forward movement of the lever carries frame 1 and the plow slightly forward relatively to wheels 59, 60, since the wheels are pivotally mounted on the frame, and since crank 81 on shaft 18 moves rearwardly with the forward rotation of the shaft, the crank being connected by bar 74 and link 73 to the swinging bracket 62 which carries wheel 60. The forward movement of frame 1 forces rack 87 rearwardly, which rack rotates segment gear 92 and disk 93 forwardly. Consequently projection 95a on disk 93 meets the forward end of lever 96 and rocks said end to the left and the rear end thereof to the right, whereby rod 100 forces yoke 110 outwardly to disconnect clutch member 111 from member 111ᵃ. Projection 95' on the disk will eventually release lever 96 so that spring 154 will restore the lever and clutch 111 to their normal position. While the clutch is out traction wheel 60 is idle, but as soon as spring 154 restores the parts the wheel is again driven, the rack and disk remaining in the positions to which they have been moved. While power is being applied to wheel 59 only the point of the plow is drawn down into the ground and when the power is again transmitted to both wheels the machine proceeds to plow the furrow.

To elevate the plow out of the ground the operator lowers lever 37 thereby rocking shaft 18 rearwardly and arm 31 upwardly, which arm with the assistance of spring 27 elevates the plow. The movement of the lever and crank 81 draws frame 1 rearwardly relatively to the wheels 59, 60. Rack 87 is drawn forwardly and disk 93 is rotated rearwardly to actuate lever 96 in the opposite direction and thereby disconnecting the power from wheel 59. Power being thus applied to wheel 60 only the plow is easily raised from the ground. The purpose of disconnecting one of the traction wheels while lifting or lowering the plow is to facilitate the movement of the plow. It insures the application of the full power of the engine to the other wheel by which the plow point is drawn down into the ground. The purpose and function of the adjustable connection between link 41 and bell crank 43 is that by adjusting the collar 52 on the crank the relative movement between frame 1 and wheel 59 may be varied at will. In breaking or finishing land it is desirable that the frame shall shift the same amount relatively to both traction wheels. And this movement is accomplished by the adjustment of collar 52. In ordinary plowing the relative movement between the main frame and wheel 59 should be and is more than that between the frame and wheel 60 since wheel 59, in the case of a left handed plow, is always in the furrow. If the plow point is dull the adjustment of collar 52 on crank 43 will insure the entrance of the point into the ground by increasing the relative movement of the frame and wheel 59.

It is now apparent that by the use of one operating lever 37 I am able not only to raise and lower the plow, but also control the depth of furrow which the plow shall cut. And also by the means connected to the lever I am able to provide relative movement between the frame and the traction wheels and control the transmission of power to the traction wheels to draw the point of the plow into the ground.

In the drawings I show a left hand plow, but it is apparent that a right hand plow may be used equally well. Furthermore, more than one plow may be supported on shaft 18 similarly to plow 12, and thereby enable the device to plow a plurality of furrows at the same time.

Many modifications of structure and arrangement of parts are possible, hence I do not wish to be limited to the precise structure and arrangement of parts described above.

What I claim is:

1. In a wheeled plow a main frame, two traction wheels pivotally supported on the frame, a lever pivotally mounted on the frame, adjustable means connecting the lever and one of the traction wheels, a shaft revolubly mounted on the frame, means connecting the lever and shaft to cause the latter to rotate when the former is actuated, means connecting the shaft and the other traction wheel, and a plow having a movable supporting connection to the shaft, the parts being so arranged that the operation of the lever rotates the shaft to raise or lower the plow and shifts the frame longitudinally relatively to the traction wheels.

2. In a wheeled plow a main frame, two traction wheels pivotally supported on the frame, a lever pivotally mounted on the frame, a shaft revolubly mounted on the frame and operatively connected to the lever, means operatively connecting the lever and one of the traction wheels, means operatively connecting the shaft and the other traction wheel, means operatively connected to both traction wheels for propelling the same and means connected to the latter means and to the second named means for automatically cutting in and out the transmission of power to one of the traction wheels, the parts being so arranged that the actuation of the lever shifts the frame relatively to the traction wheels and automatically disconnects one of the traction wheels from the propelling means.

3. In a wheeled plow a main frame, a lever pivotally secured to the frame, a shaft revolubly mounted on the frame and operatively connected to the lever, two traction wheels pivotally mounted on the frame, mechanism on the frame and connected to the wheels to rotate the same, means connecting the lever to one of the traction wheels, means connecting the shaft and the other traction wheel, a movable rack connected to the latter means, a segment gear in mesh with the rack and having an adjustable disk thereon, a lever adapted to be actuated by the disk and connected to the traction wheel driving mechanism and adapted to disconnect said mechanism from one of the traction wheels, the parts being so arranged that by actuating the lever forwardly the shaft is caused to rotate to shift the frame relatively to the traction wheels whereby the rack is moved rearwardly to rotate the segment gear and disk and actuate the second lever for the purposes described.

4. In a wheeled plow, a frame, two traction wheels pivotally supported on the frame, a power mechanism to rotate the wheels, a lever having a connection to the power mechanism for connecting or disconnecting the mechanism to or from either traction wheel, a revolubly mounted disk to rock the lever, a reciprocating rack to rotate the disk, means pivotally connected to one of the driving wheel supports and to the rack, and means operatively connected to the latter means to reciprocate the same and the rack whereby the lever is actuated to connect or disconnect the power mechanism to or from either traction wheel.

5. In a wheeled plow a main frame, two traction wheels pivotally supported on the frame, a lever pivotally mounted on the frame, adjustable means connecting the lever and one of the traction wheels, a shaft revolubly mounted on the frame, means connecting the lever and shaft to cause the latter to rotate when the former is actuated, means connecting the shaft and the other traction wheel for providing relative movement between the main frame and the pivotal point of said wheel and a plow having a movable supporting connection to the shaft, said connection comprising a bracket secured to the plow and a member adjustably secured to the shaft and adapted to articulate with the bracket to raise or lower the plow upon the rotation of the shaft.

In witness whereof I have hereunto signed my name in the presence of two witnesses.

JOHN F. HUBLER.

Witnesses:
 HELEN F. GLENN,
 ELWIN M. HULSE.